United States Patent Office 2,887,519
Patented May 19, 1959

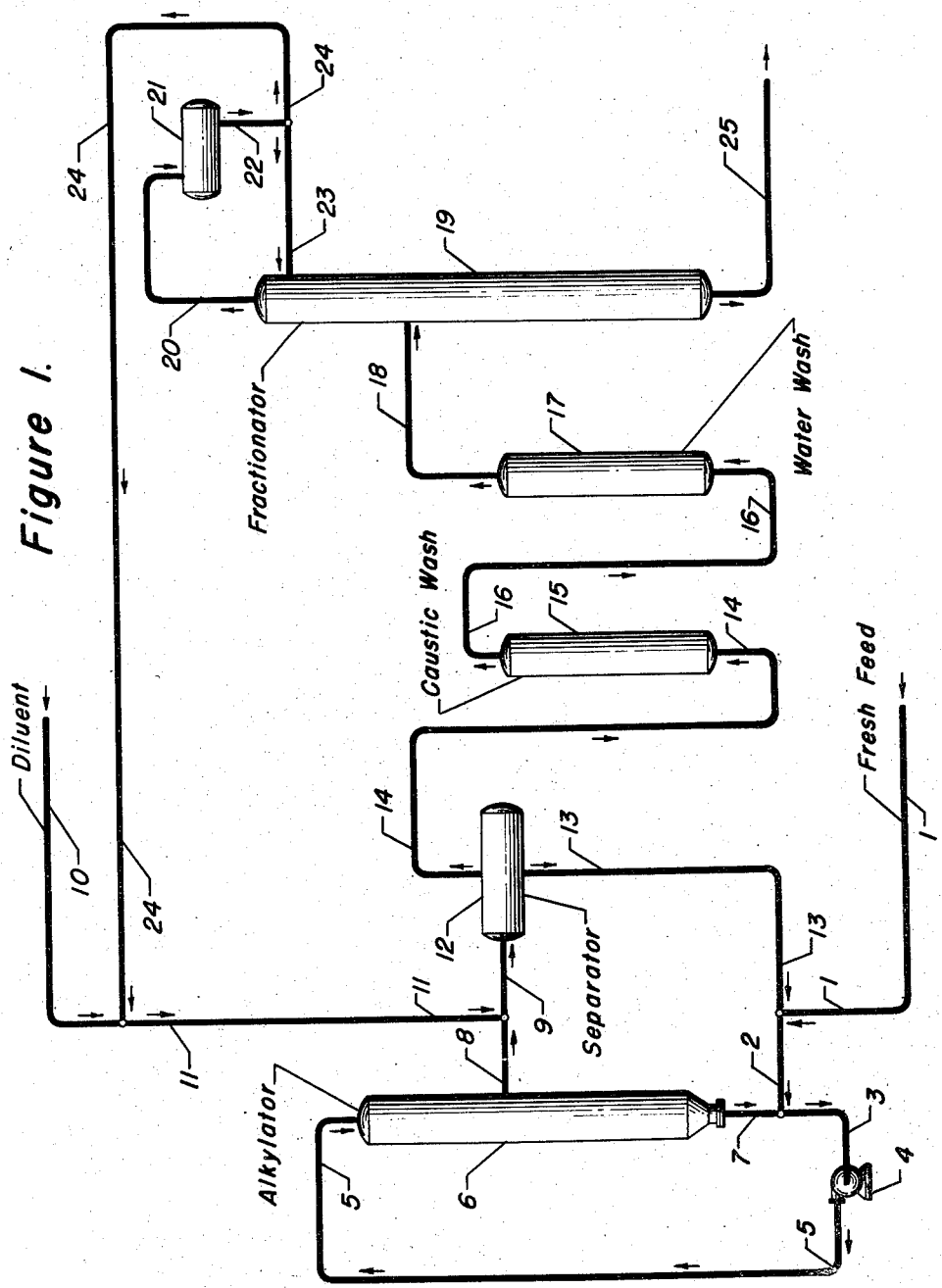

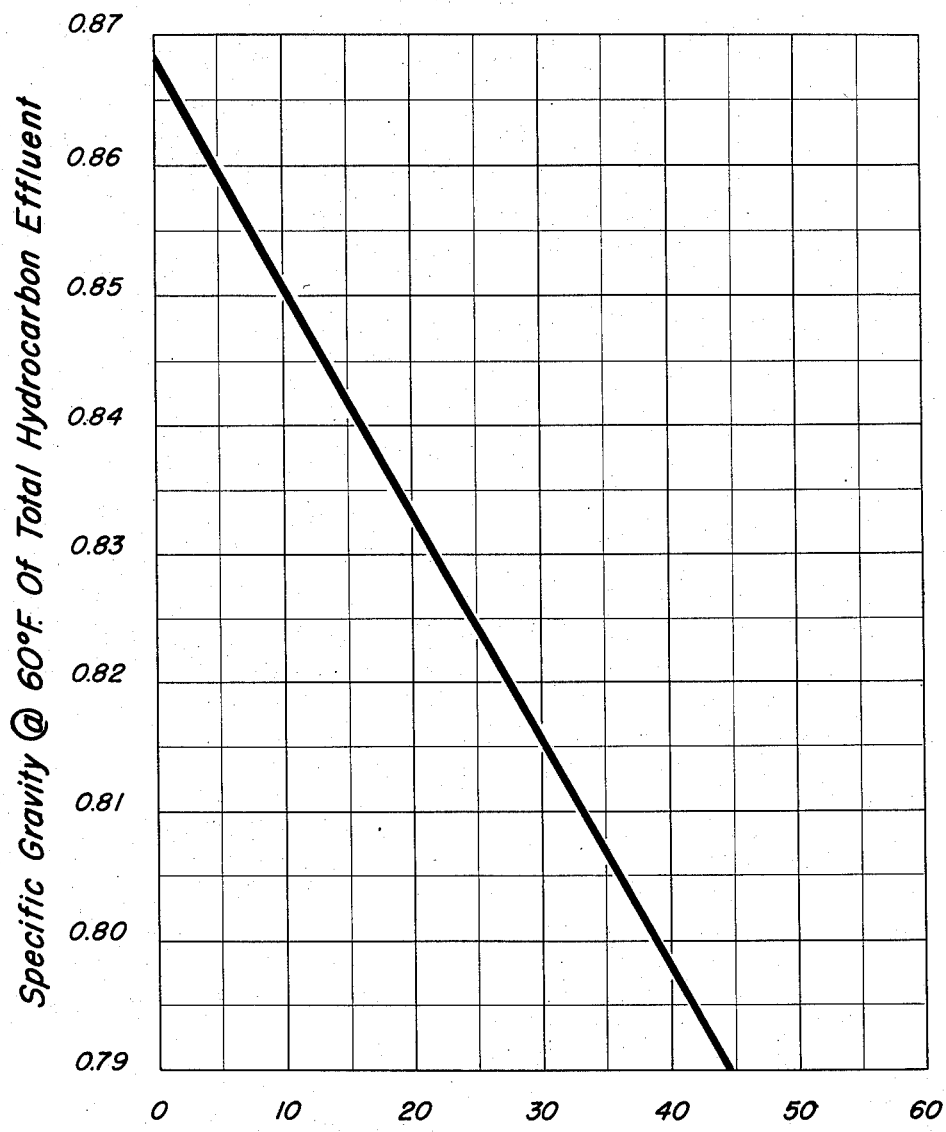

---

2,887,519

SULFURIC ACID CATALYZED ALKYLATION OF AROMATIC COMPOUNDS

George L. Hervert, Downers Grove, Ill., assignor, by mesne assignments, to Universal Oil Products Company, Des Plaines, Ill., a corporation of Delaware Application May 22, 1956, Serial No. 586,453

11 Claims. (Cl. 260—671)

This invention relates to the alkylation of an aromatic compound with an olefin hydrocarbon to produce a higher molecular weight alkylated aromatic compound to the nucleus of which is attached no more than one alkyl group derived from the olefinic hydrocarbon alkylating agent. More specifically, this invention relates to the alkylation of an aromatic hydrocarbon with an olefin hydrocarbon to produce a higher molecular weight alkylated aromatic hydrocarbon to the nucleus of which is attached no more than one alkyl group derived from the olefinic hydrocarbon alkylating agent. Still more specifically, this invention relates to a process for the alkylation of an aromatic hydrocarbon with an olefin hydrocarbon in the presence of a catalyst comprising sulfuric acid.

The alkylation of aromatic compounds, particularly aromatic hydrocarbons, with olefin hydrocarbons to produce higher molecular weight alkylation products in the presence of sulfuric acid as the catalyst has been known for some time. In such processes the sulfuric acid catalyst utilized has preferably contained from about 80 to about 100% $H_2SO_4$ or higher, said higher concentration containing free sulfur trioxide up to about 15% of the latter component. Concentrations within the above-mentioned ranges have been found most desirable for obtaining maximum yields with minimum side reactions, such as polymerization or depolymerization of the olefinic hydrocarbon utilized. In utilizing these acids of high concentration, one disadvantage which becomes apparent immediately is that small amounts of sulfonation of the aromatic compounds take place with the formation of arylsulfonic acids. This disadvantage becomes extreme when the arylsulfonic acids are those of the already alkylated aromatic compounds, since, in such cases, these high molecular weight alkylarylsulfonic acids have outstanding surface-active properties. While the ultimate utility of these high molecular weight alkylated aromatic compounds, particularly alkylated aromatic hydrocarbons, is for use in preparation of surface active agents, it is undesirable to form these high molecular weight alkylarylsulfonic acids at this particular point in the overall process. As hereinabove stated, however, the best one can do when using sulfuric acid of the above-mentioned concentration as an alkylation catalyst is to minimize this arylsulfonic acid formation. These alkylarylsulfonic acids as formed in small quantities cause emulsification of the sulfuric acid and unreacted aromatic compound and alkylated aromatic compounds so that settling times for the separation of sulfuric acid catalyst for recirculation in the process are greatly increased, in some cases, to periods of time which make the process most uneconomical. It is therefore an object of this invention to provide a sulfuric acid catalyzed process for the alkylation of aromatic compounds in which such settling times are materially reduced. This object can be achieved readily by the operation and utilization of such a process in the manner hereinafter set forth.

In brief, the above set forth object is accomplished by dilution of the alkylation zone effluents with a paraffinic hydrocarbon of specified molecular weight and type. While prior art processes have in some instances utilized such paraffinic hydrocarbons concurrently in the reaction zone along with the reactants and sulfuric acid catalyst, such prior art processes suffer from the inherent disadvantage that the vessel utilized as the reaction zone must be considerably increased in size to accommodate the increased volume of the paraffinic hydrocarbon in addition to the reactants and catalyst. Thus, an additional object of the present process is minimizing the necessary size for the reaction zone vessel while at the same time obtaining fast settling and separation of the reaction products from sulfuric acid catalyst, which sulfuric acid catalyst can then be reused for recycle to the reaction zone in a continuous type process which is desirable for the above-specified type reaction.

In one embodiment this invention relates to the process for the monoalkylation of aromatic compounds which comprises contacting in a reaction zone in liquid phase an aromatic compound and a normally liquid olefin at an alkylation temperature and pressure in the presence of an alkylation catalyst consisting of sulfuric acid, diluting the effluents of said reaction zone with a paraffinic hydrocarbon free from tertiary carbon atoms and containing one carbon atom less than the aromatic compound aforesaid, separating from the diluted effluent a lower layer liquid phase comprising sulfuric acid alkylation catalyst and an upper layer liquid phase comprising paraffinic hydrocarbon diluent, unreacted aromatic compound, and resulting monoalkylated aromatic compound, passing said upper layer liquid phase to a fractionation zone, separating an aromatic compound-free paraffinic hydrocarbon overhead therefrom, and recycling said paraffinic hydrocarbon overhead to the dilution step as aforesaid.

Another embodiment of this invention relates to a process for the monoalkylation of aromatic hydrocarbons which comprises contacting in a reaction zone in liquid phase an aromatic hydrocarbon with a normally liquid olefin at an alkylation temperature and pressure in the presence of an alkylation catalyst consisting essentially of sulfuric acid, diluting the effluents of said reaction zone with a normally liquid paraffinic hydrocarbon free from tertiary carbon atoms and containing at least one carbon atom less than the aromatic hydrocarbon aforesaid, separating from said diluted effluent a lower layer liquid phase comprising sulfuric acid alkylation catalysts and an upper layer liquid phase comprising primarily paraffinic hydrocarbon diluent, unreacted aromatic hydrocarbon, and resulting monoalkylated aromatic hydrocarbon, passing said upper layer liquid phase to a fractionation zone, separating an aromatic hydrocarbon-free paraffinic hydrocarbon overhead therefrom, and recycling said paraffinic hydrocarbon overhead to the dilution step as aforesaid.

A more specific embodiment of the present invention relates to a process for the monoalkylation of aromatic hydrocarbons which comprises contacting in a reaction zone in liquid phase a molar excess of an aromatic hydrocarbon with a normally liquid olefin at an alkylation temperature of from about 0° to about 50° C. and at a pressure of from about atmospheric to about 1000 p.s.i. in the presence of an alkylation catalyst consisting essentially of sulfuric acid, diluting the effluents of said reaction zone with from about 25 to about 90% by weight based on the aromatic hydrocarbon in the feed of a normally liquid paraffinic hydrocarbon free from tertiary carbon atoms and containing at least one carbon atom less than the aromatic hydrocarbon aforesaid, separating from said diluted effluent a lower layer liquid phase comprising primarily sulfuric acid alkylation catalyst and an upper layer liquid phase comprising paraffinic hydrocarbon diluent, unreacted aromatic hydrocarbon, and resulting monoalkylated aromatic hydrocarbon, passing said upper layer liquid phase to a fractionation zone, separating an aromatic hydrocarbon-free paraffinic hydrocarbon overhead therefrom, recycling said paraffinic hydrocarbon to the dilution step as aforesaid, and recovering the monalkylated aromatic hydrocarbon from the bottom fraction from said fractionation zone.

A specific embodiment of the present invention relates to a process for the monoalkylation of benzene which comprises contacting in a reaction zone in liquid phase a molar excess of benzene with a polypropylene containing from about 9 to about 18 carbon atoms per molecule at an alkylation temperature of from about 0° to about 50° C. and at a pressure of from about atmospheric to about 1000 p.s.i. in the presence of an alkylation catalyst consisting essentially of sulfuric acid, diluting the effluents of said reaction zone with from about 25 to about 90% by weight based on the benzene in the feed of n-pentane, separating from said diluted effluent a lower layer liquid phase comprising primarily sulfuric acid alkylation catalyst and an upper layer liquid phase comprising n-pentane, benzene, and resulting monoalkylated benzene, passing said upper layer liquid phase to a fractionation zone, separating benzene-free n-pentane overhead therefrom, recycling said n-pentane overhead to the dilution step as aforesaid, and recovering the monoalkylated benzene from the bottom fraction from said fractionation zone.

Another specific embodiment of this invention relates to a process for the monoalkylation of benzene which comprises contacting in a reaction zone in liquid phase a molar excess of benzene with a dodecene at an alkylation temperature of from about 0° to about 50° C. and at a pressure of from about atmospheric to about 1000 p.s.i. in the presence of an alkylation catalyst consisting essentially of sulfuric acid, diluting the effluents of reaction zone with from about 25 to about 90% by weight based on the benzene in the feed of n-pentane, separating from said diluted effluent a lower layer liquid phase comprising primarily sulfuric acid alkylation catalyst and an upper layer liquid phase comprising n-pentane, benzene, and resulting dodecylbenzene, passing said upper layer liquid phase to a fractionation zone, separating a benzene-free n-pentane overhead therefrom, recycling said n-pentane overhead to the dilution step as aforesaid, and recovering the dodecylbenzene of the bottom fraction from said fractionation zone.

Other embodiments of this invention will be apparent to one skilled in the art from a consideration of the specification as hereinafter set forth in detail, and from the drawings attached hereto.

The aromatic compounds which will be subjected to alkylation according to the terms of this invention may be described as compounds containing an aromatic nucleus having at least one replaceable nuclear hydrogen atom attached thereto. The preferred aromatic compounds which may be alklated in accordance with this process are aromatic hydrocarbons having at least one replaceable hydrogen atom attached to a nuclear carbon atom. Specific examples of suitable aromatic compounds include benzene, toluene, o-xylene, m-xylene, p-xylene, ethylbenzene, cumene, cymene, n-propylbenzene, etc., durene, etc., and polynuclear aromatic hydrocarbons such as naphthalene, alpha-methylnaphtalene, beta-methylnaphthalene, polyalkylnaphthalenes, tetralin, etc. Of the aromatic hydrocarbons utilizable for the production of the monoalkylated aromatic hydrocarbon product by the alkylation thereof with an olefinic hydrocarbon, I prefer to utilize a benzenoid aromatic hydrocarbon containing no more than two alkyl substituents, especially when said product is to be utilized for the production of detergents by subsequent sulfonation thereof. Preferably, neither of said alkyl substituents is of greater chain length than the ethyl radical and more desirable still are methyl radicals. Thus, benzene, toluene, a xylene, methylethylbenzene and diethylbenzene comprise particularly preferred aromatic hydrocarbons and of this group it is preferred to use benzene and toluene for the production of detergents having the highest degree of detergent activity. However, when alkylated aromatic hydrocarbons are desired for purposes other than detergent production, it is within the scope of the present invention to utilize aromatic hydrocarbons as hereinbefore stated as the reactant to be alkylated.

Of the olefinic hydrocarbons which may be utilized in the alkylation process of the present invention, normally liquid olefinic hydrocarbons are preferred, and of such normally liquid olefinic hydrocarbons, those known in the art as propylene polymers or polypropylenes are most particularly preferred. Thus, the utilization of olefins such as a hexene, a heptene, an octene, a nonene, a decene, an undecene, a dodecene, a tridecene, a tetradecene, a pentadecene, an octadecene, etc., are within the scope of the present invention. As stated hereinabove, the particularly preferred hydrocarbons are those known in the art as propylene polymers or polypropylenes. These polypropylenes are conveniently produced by thermal or catalytic polymerization of propylene, said catalytic polymerization usually being carried out in the presence of a solid phosphoric acid type. The propylene polymers produced by such process are conveniently fractionated into fractions, the boiling range of which can be made to correspond to the desired molecular weight olefinic product. Thus, for example, a polypropylene can have a boiling range corresponding to a $C_9$–$C_{18}$ molecular weight, or if desired, the boiling range can be adjusted or controlled to yield only a $C_{12}$ molecular weight fraction, or a $C_{12}$–$C_{15}$ molecular weight fraction, or a $C_{12}$–$C_{18}$ molecular weight fraction, etc. A particularly preferred olefinic hydrocarbon fraction is one having a boiling range from about 170° to about 225° C. and containing mainly propylene tetramer.

In the alkylation step of the present process, the aromatic reactant and olefinic hydrocarbon alkylating agent may be introduced simultaneously or in admixture with each other into the alkylation reactor containing the sulfuric acid alkylation catalyst of the desired concentration, or alternatively the aromatic hydrocarbon may be contacted with the sulfuric acid alkylation product followed by the addition of the olefinic hydrocarbon alkylate thereto. The molecular proportion of aromatic hydrocarbon to olefinic hydrocarbon alkylating agent introduced into the alkylation reactor is generally maintained above equimolecular ratio, preferably about 2:1 to about 30:1 or even higher to minimize polyalkylation of the aromatic reactant. As set forth hereinabove, the alkylation catalyst consists essentially of sulfuric acid of from about 80 to about 100% or higher concentration, said higher concentration containing free sulfur trioxide up to about 15% of the latter component. The preferred alkylation catalyst comprises sulfuric acid of from about 95 to about 100% concentration.

When utilizing the above-specified ratio of aromatic reactant to olefinic hydrocarbon alkylating agent, said hydrocarbons are maintained in the alkylation reactor in contact with the sulfuric acid alkylation catalyst for a period which may vary from about 5 to about 80 minutes, the particular time depending upon the relative ease of alkylating the selected charge stocks. The temperature maintained in the alkylation reactor in the presence of the sulfuric acid alkylation catalyst is within the range of from about 0° to about 50° C. Superatmospheric pressures sufficient to maintain the reactants in liquid phase are maintained during the alkylation reaction, although pressures in excess of 1000 p.s.i. are usually not required. The process conditions vary with the particular charging stock and with the particular concentration of sulfuric acid alkylation catalyst, but the conditions necessary to fix these variables are well known to those skilled in the art of alkylating hydrocarbons so that they may be readily determined when the above variables are known.

As hereinabove set forth, after the desired alkylation has taken place, the effluents of the alkylation reaction zone are diluted with a paraffinic hydrocarbon free from tertiary carbon atoms containing at least one carbon atom less than the aromatic compound to be alkylated. The paraffinic hydrocarbon is preferably a normally liquid paraffinic hydrocarbon for ease of operation. Thus, typical suitable paraffinic hydrocarbons include n-pentane, neopentane, n-hexane, 2,2-dimethylbutane or neohexane, n-heptane, 2,2-dimethylpentane, 3,3-dimethylpentane, n-octane, n-nonane, etc. It will be noted that none of the above-mentioned paraffinic hydrocarbons utilizable as diluents contain a tertiary carbon atom. A further limitation in the above-utilizable paraffinic hydrocarbons is that they are lower boiling than the aromatic compound being alkylated in the aforesaid process. By lower boiling is meant that the paraffinic compounds should be substantially lower boiling so that no azeotropes of said paraffinic hydrocarbons with unreacted aromatic compound will be formed as set forth hereinafter. Thus a further limitation is that the paraffinic hydrocarbon to be utilized shall contain at least one carbon atom less than the aromatic compound to be alkylated. For example, when benzene is being alkylated, the normally liquid paraffinic hydrocarbon will comprise n-pentane or neopentane or mixtures thereof. When the aromatic compound to be alkylated is toluene, the paraffinic hydrocarbon will comprise n-hexane, neohexane, n-pentane, or neopentane, or mixtures thereof. It is thus seen that the paraffinic hydrocarbon does not need to contain just one carbon atom less than the aromatic compound to be alkylated, but in any case must contain at least one carbon atom less. Another example is the alkylation of a xylene where the paraffinic hydrocarbon diluent may be n-heptane, 2,2-dimethylpentane, 3,3-dimethylpentane, n-hexane, 2,2-dimethylbutane, n-pentane, neopentane, or mixtures of any one or more of the above-mentioned paraffinic hydrocarbons.

By utilizing the paraffinic hydrocarbons as specified hereinabove, the paraffinic hydrocarbons can be readily removed by fractionation, stripping, or by flashing in a further step in my process and may then be recycled to further dilute the reaction zone effluent as hereinabove set forth. From the above description, the particular type of paraffinic hydrocarbon diluent to be utilized should be readily apparent to one skilled in the art. Further illustrations will be set forth hereinafter in reference to the attached drawings and specific examples.

The diluted reaction zone effluents containing paraffinic hydrocarbon as set forth hereinabove, unreacted aromatic compound, and resulting monoalkylated aromatic compound is next passed to a settler or settling zone. It is in this settler or settling zone that another novel feature of the process of this invention comes into full play. Whether or not the alkylation reaction has been carried out in a batch or continuous manner followed by dilution, the acid catalyst must be separated from the organic reactants and products. Emulsification using sulfuric acid as the catalyst is a commonly observed phenomena. While the sulfuric acid catalyst is of higher density than organic reactants and products, separation into two layers does not take place readily. Thus settling time can be a critical variable in the design and operation of such a process. The dilution of the reaction zone effluents as hereinabove set forth results in settling time decreases from 100% to 1000% or more. The sulfuric acid catalyst as recovered is then suitable for reuse or recirculation in the process and organic reactants and products are available for separation by suitable means such as by precise fractionation. The emulsified zone which has been frequently observed in settling zones between the two layers in typical sulfuric acid alkylation processes is eliminated by use of the paraffinic diluent in the manner of this process.

The process of the present invention can be further illustrated with reference to Figure I. This drawing is illustrative only of a general embodiment of the present process and no intention to unduly limit the generally broad scope of the present invention should be drawn therefrom.

Fresh feed comprising aromatic compounds and olefin hydrocarbon is introduced via lines 1, 2, and 3 to circulating pump 4 which discharges into line 5 to time tank alkylation zone 6. The time tank alkylation zone 6 may be a baffled contacting zone to insure maximum mixing and emulsification of the feed with the sulfuric acid catalyst. This feed and sulfuric acid catalyst is circulated in the time tank by withdrawal from time tank contacting zone 6 through lines 7 and 3 to circulating pump 4 as hereinabove described. The reactants are maintained in contact with the sulfuric acid catalyst for a time sufficient to insure alkylation of the aromatic compound with the olefinic hydrocarbon. A portion of the time tank reaction zone contents are continuously withdrawn through lines 8 and 9 to separation zone 12, and the withdrawn reaction zone effluent is continuously diluted with paraffinic hydrocarbon from lines 10 and 24 which are connected with line 11 which discharges the paraffinic diluent to line 9 to separation zone 12 along with the alkylation zone effluent. The alkylation zone effluents diluted with paraffinic hydrocarbon are settled and separated from sulfuric acid catalyst in separation zone 12. The sulfuric acid catalyst is continuously withdrawn from separation zone 12 through lines 13, 2, and 3, and recirculated back to the time tank alkylation zone 6. The reaction zone effluents comprising paraffinic hydrocarbon diluent, unreacted aromatic compound, and alkylated aromatic compound are withdrawn from settling zone 12 through line 14 and passed through caustic wash zone 15 for removal of residual sulfuric acid and sulfonic acids. The caustic washed diluted effluent is then passed through line 16 to water wash zone 17 where residual caustic is removed therefrom. The water washed diluted hydrocarbons are then withdrawn from water wash zone 17 through line 18 and passed to fractionation zone 19.

Fractionation zone 19 may be a simple stripping zone or a recise fractionation zone depending upon the particular unit requirements. The paraffinic hydrocarbon diluent is separated overhead from fractionation zone 19, and withdrawn therefrom through line 20 to the fractionation zone overhead receiver 21. The paraffinic hydrocarbon diluent is then withdrawn from overhead receiver 21 through line 22 connected to lines 23 and 24. Line 23 supplies the necessary amount of paraffinic hydrocarbon diluent reflux to fractionation zone 19. The net paraffinic hydrocarbon is recycled via line 24 to lines 11 and 9 for reuse in separation zone 12. The unreacted aromatic compound and monoalkylated compound is withdrawn from the bottom of fractionation zone 19 through line 25 to fractionation means not shown. The unreacted aromatic compound may be separated therefrom by suitable fractionation and recycled to line 1 for reuse in the process. The monoalkylated aromatic compound product can then be recovered from this fractionation zone bottoms fraction by conventional means, not shown.

This example illustrates the alkylation of benzene with propylene tetramer using a sulfuric acid catalyst. The propylene tetramer is a $C_{12}$ olefin hydrocarbon fraction boiling from about 170° C. to about 225° C. It has a specific gravity at 60° F. of 0.77 and a bromine number of 97.

The following reaction conditions are utilized: Space time (volume of sulfuric acid per volume of hydrocarbon per minute) of 20; hydrocarbon to sulfuric acid ratio of 3.0; benzene to tetramer mol ratio of 10.0; reaction temperature of 32° F., and $H_2SO_4$ concentration of 96%.

To a time tank reaction zone containing sulfuric acid as hereinabove set forth is charged 3980 pounds per hour of propylene tetramer, and 2030 pounds per hour of benzene. This net charge is combined with 16,460 pounds per hour of recycle benzene to give the proper benzene to tetramer mol ratio of 10:1 in the reaction zone. A hydrocarbon reaction zone effluent containing 16,460 pounds per hour of benzene, 768 pounds per hour of light alkylate, 3820 pounds per hour of detergent alkylate, and 575 pounds per hour of bottoms plus sulfuric acid is withdrawn from the reaction zone to a settler zone. This reaction zone effluent is diluted with 7900 pounds per hour of n-pentane. The diluted effluent settles on an average in 60 minutes time with this addition of n-pentane to the effluent prior to settling. The effluent requires a 24–48 hour settling time in the absence of the n-pentane diluent.

The settled hydrocarbon layer is fractionated and the n-pentane recovered overhead therefrom and recirculated. The detergent alkylate or dodecylbenzene yield is 3820 pounds per hour or a total of 300 barrels per day. The hydrocarbons in the reaction zone effluent have a specific gravity after dilution of 0.794. The small changes in specific gravity which occur with pentane dilution can be seen by reference to Figure II. This figure is a graph of the specific gravity at 60° F. of the total hydrocarbon effluent plotted against n-pentane dilution based on the weight percent of n-pentane per weight of benzene in the reaction zone feed. In this example, the benzene in the feed is 2030 pounds per hour of net benzene feed plus 16,460 pounds per hour of recycle benzene for a total of 18,490 pounds per hour. The amount of n-pentane (weight percent) based on the benzene charge is about 42.5%. This corresponds to a specific gravity as shown in Figure II of 0.794. As stated above, the settling time with this pentane dilution is 60 minutes. For no pentane in the hydrocarbon effluent the specific gravity only goes from 0.794 to 0.868, a change of 74/1000 in specific gravity units. This small change in specific gravity is equivalent to going from a settling time of 60 minutes up to a settling time of 24–48 hours which is not economically feasible on a commercial scale. Thus, n-pentane addition results in rapid settling and, in accordance with my invention, this is accomplished without increasing the time-tank alkylation zone volume to allow for the necessary n-paraffin diluent.

I claim as my invention:

1. A process for the monalkylation of aromatic compounds which comprises contacting in a reaction zone in liquid phase an aromatic compound with a normally liquid olefin at an alkylation temperature and pressure in the presence of an alkylation catalyst consisting essentially of sulfuric acid, commingling with the effluents of said reaction zone an inert diluent consisting essentially of normally liquid paraffinic hydrocarbon free from tertiary carbon atoms and containing at least one carbon atom less than the aromatic compound aforesaid, said diluent being in an amount of from about 25 to about 90% by weight of said aromatic compound, separating from said diluted effluent a lower layer liquid phase comprising primarily sulfuric acid alkylation catalyst and an upper layer liquid phase comprising paraffinic hydrocarbon diluent, unreacted aromatic compound, and the resulting monoalkylated aromatic compound, passing said upper layer liquid phase to a fractionation zone, separating an aromatic compound-free paraffinic hydrocarbon overhead therefrom, and recycling said paraffinic hydrocarbon overhead to the dilution step as aforesaid.

2. A process for the monalkylation of aromatic hydrocarbons which comprises contacting in a reaction zone in liquid phase an aromatic hydrocarbon with a normally liquid olefin at an alkylation temperature and pressure in the presence of an alkylation catalyst consisting essentially of sulfuric acid, commingling with the effluents of said reaction zone an inert diluent consisting essentially of normally liquid paraffinic hydrocarbon free from tertiary carbon atoms and containing at least one carbon atom less than the aromatic hydrocarbon aforesaid, said diluent being in an amount of from about 25 to about 90% by weight of said aromatic hydrocarbon, separating from said diluted effluent a lower layer liquid phase comprising primarily sulfuric acid alkylation catalyst and an upper layer liquid phase comprising primarily paraffinic hydrocarbon diluent, unreacted aromatic hydrocarbon, and the resulting monalkylated aromatic hydrocarbon, passing said upper layer liquid phase to a fractionation zone, separating an aromatic hydrocarbon-free paraffinic hydrocarbon overhead therefrom, and recycling said paraffinic hydrocarbon overhead to the dilution step as aforesaid.

3. A process for the monoalkylation of aromatic hydrocarbons which comprises contacting in a reaction zone in liquid phase a molar excess of an aromatic hydrocarbon with a normally liquid olefin at an alkylation temperature of from about 0° to about 50° C. and at a pressure of from about atmospheric to about 1000 p.s.i. in the presence of an alkylation catalyst consisting essentially of sulfuric acid, diluting the effluents of said reaction zone with from about 25 to about 90% by weight based on the aromatic hydrocarbon in the feed of an inert diluent consisting essentially of a normally liquid paraffinic hydrocarbon free from tertiary carbon atoms and containing at least one carbon atom less than the aromatic hydrocarbon aforesaid, separating from said diluted effluent a lower layer liquid phase comprising primarily sulfuric acid alkylation catalyst and an upper layer liquid phase comprising paraffinic hydrocarbon diluent, unreacted aromatic hydrocarbon, and resulting monoalkylated aromatic hydrocarbon, passing said upper layer liquid phase to a fractionation zone, separating an aromatic hydrocarbon-free paraffinic hydrocarbon overhead therefrom, recycling said paraffinic hydrocarbon overhead to the dilution step as aforesaid, and recovering the monoalkylated aromatic hydrocarbons from the bottom fraction from said fractionation zone.

4. A process for the monoalkylation of benzene which comprises contacting in a reaction zone in liquid phase a molar excess of benzene with a normally liquid olefin at an alkylation temperature of from about 0° to about 50° C. and at a pressure of from about atmospheric to about 1000 p.s.i. in the presence of an alkylation catalyst consisting essentially of sulfuric acid, diluting the effluents of said reaction zone with from about 25 to about 90% by weight based on the benzene in the feed of a normally liquid paraffinic hydrocarbon free from tertiary carbon atoms and containing at least one carbon atom less than the benzene, separating from said diluted effluent a lower layer liquid phase comprising primarily sulfuric acid alkylation catalyst and an upper layer liquid phase comprising paraffinic hydrocarbon diluent, benzene, and resulting monalkylated benzene, passing said upper layer liquid phase to a fractionation zone, separating a benzene-free paraffinic hydrocarbon overhead therefrom, recycling said paraffinic hydrocarbon overhead to the dilution step as aforesaid, and recovering the monoalkylated benzene from the bottom fraction from said fractionation zone.

5. A process for the monoalkylation of toluene which comprises contacting in a reaction zone in liquid phase a molar excess of toluene with a normally liquid olefin at an alkylation temperature of from about 0° to about 50° C. and at a pressure of from about atmospheric to about 1000 p.s.i. in the presence of an alklation catalyst consisting essentially of sulfuric acid, diluting the effluents of said reaction zone with from about 25 to about 90% by weight based on the toluene in the feed of a normally liquid paraffinic hydrocarbon free from tertiary carbon atoms and containing at least one carbon atom less than the toluene, separating from said diluted effluent a lower layer liquid phase comprising primarily sulfuric acid alkylation catalyst and an upper layer liquid phase comprising paraffinic hydrocarbon diluent, toluene, and resulting monoalkylated toluene, passing said upper layer liquid phase to a fractionation zone, separating a toluene-free paraffinic hydrocarbon overhead therefrom, recycling said paraffinic hydrocarbon overhead to the dilution step as aforesaid and recovering the monoalkylated toluene from the bottom fraction from said fractionation zone.

6. A process for the monoalkylation of a xylene which comprises contacting in a reaction zone in liquid phase a molar excess of a xylene with a normally liquid olefin at an alkylation temperature of from about 0° to about 50° C. and at a pressure of from about atmospheric to about 1000 p.s.i. in the presence of an alkylation catalyst consisting essentially of sulfuric acid, diluting the effluents of said reaction zone with from about 25 to about 90% by weight based on the xylene in the feed of a normally liquid paraffinic hydrocarbon free from tertiary carbon atoms and containing at least one carbon atom less than the xylene, separating from said diluted effluent a lower layer liquid phase comprising primarily sulfuric acid alkylation catalyst and an upper layer liquid phase comprising paraffinic hydrocarbon diluent, a xylene, and resulting monoalkylated xylene, passing said upper layer liquid phase to a fractionation zone, separating a xylene-free paraffinic hydrocarbon overhead therefrom, recycling said paraffinic hydrocarbon overhead to the dilution step as aforesaid and recovering the monoalkylated xylene from the bottom fraction from said fractionation zone.

7. A process for the monoalkylation of benzene which comprises contacting in a reaction zone in liquid phase a molar excess of benzene with a polypropylene containing from about 9 to about 18 carbon atoms per molecule at an alkylation temperature of from about 0° to about 50° C. and at a pressure of from about atmospheric to about 1000 p.s.i. in the presence of an alkylation catalyst consisting essentially of sulfuric acid, diluting the effluents of said reaction zone with from about 25 to about 90% by weight based on the benzene in the feed of n-pentane, separating from said diluted effluent a lower layer liquid phase comprising primarily sulfuric acid alkylation catalyst and an upper layer liquid phase comprising n-pentane, benzene, and resulting monoalkylated benzene, passing said upper layer liquid phase to a fractionation zone, separating benzene-free n-pentane overhead therefrom, recycling said n-pentane overhead to the dilution step as aforesaid, and recovering the monoalkylated benzene from the bottom fraction from said fractionation zone.

8. A process for the monoalkylation of toluene which comprises contacting in a reaction zone in liquid phase a molar excess of toluene with a polypropylene containing from about 9 to about 18 carbon atoms per molecule at an alkylation temperature of from about 0° to about 50° C. and at a pressure of from about atmospheric to about 1000 p.s.i. in the presence of an alkylation catalyst consisting essentially of sulfuric acid, diluting the effluents of said reaction zone with from about 25 to about 90% by weight based on the toluene in the feed of n-pentane, separating from said diluted effluent a lower layer liquid phase comprising primarily sulfuric acid alkylation catalyst and an upper layer liquid phase comprising n-pentane, toluene, and resulting monoalkylated toluene, passing said upper layer liquid phase to a fractionation zone, separating toluene-free n-pentane overhead therefrom, recycling said n-pentane overhead to the dilution step as aforesaid, and recovering the monoalkylated toluene from the bottom fraction from said fractionation zone.

9. A process for the monoalkylation of a xylene which comprises contacting in a reaction zone in liquid phase a molar excess of a xylene with a polypropylene containing from about 9 to about 18 carbon atoms per molecule at an alkylation temperature of from about 0° to about 50° C. and at a pressure of from about atmospheric to about 1000 p.s.i. in the presence of an alkylation catalyst consisting essentially of sulfuric acid, diluting the effluents of said reaction zone with from about 25 to about 90% by weight based on the xylene in the feed of n-pentane, separating from said diluted effluent a lower layer liquid phase comprising primarily sulfuric acid alkylation catalyst and an upper layer liquid phase comprising n-pentane, a xylene, and resulting monoalkylated xylene, passing said upper layer liquid phase to a fractionation zone, separating xylene-free n-pentane overhead therefrom, recycling said n-pentane overhead to the dilution step as aforesaid, and recovering the monoalkylated xylene from the bottom fraction from said fractionation zone.

10. A process for the monoalkylation of benzene which comprises contacting in a reaction zone in liquid phase a molar excess of benzene with a dodecene at an alkylation temperature of from about 0° to about 50° C. and at a pressure of from about atmospheric to about 1000 p.s.i. in the presence of an alkylation catalyst consisting essentially of sulfuric acid, diluting the effluents of said reaction zone with from about 25 to about 90% by weight based on the benzene in the feed of n-pentane, separating from said diluted effluent a lower layer liquid phase comprising primarily sulfuric acid alkylation catalyst and an upper layer liquid phase comprising n-pentane, benzene, and resulting monoalkylated benzene, passing said upper layer liquid phase to a fractionation zone, separating a benzene-free n-pentane overhead therefrom, recycling said n-pentane overhead to the dilution step as aforesaid, and recovering the monoalkylated benzene from the bottom fraction from said fractionation zone.

11. A process for the monoalkylation of toluene which comprises contacting in a reaction zone in liquid phase a molar excess of toluene with a dodecene at an alkylation temperature of from about 0° to about 50° C. and at a pressure of from about atmospheric to about 1000 p.s.i. in the presence of an alkylation catalyst consisting essentially of sulfuric acid, diluting the effluents of said reaction zone with from about 25 to about 90% by weight based on the toluene in the feed of n-pentane, separating from said diluted effluent a lower layer liquid phase comprising primarily sulfuric acid alkylation catalyst and an upper layer liquid phase comprising n-pentane, toluene, and resulting monoalkylated toluene, passing said upper layer liquid phase to a fractionation zone, separating a toluene-free n-pentane overhead therefrom, recycling said n-pentane overhead to the dilution step as aforesaid, and recovering the monoalkylated toluene from the bottom fraction from said fractionation zone.

References Cited in the file of this patent

UNITED STATES PATENTS

| | | |
|---|---|---|
| 2,436,480 | Mavity | Feb. 24, 1948 |
| 2,582,047 | Lee | Jan. 8, 1952 |
| 2,718,526 | Mammen | Sept. 20, 1955 |
| 2,771,496 | Hervert | Nov. 20, 1956 |

FOREIGN PATENTS

| | | |
|---|---|---|
| 669,657 | Great Britain | Apr. 9, 1952 |